United States Patent [19]

Perini et al.

[11] Patent Number: 4,832,141
[45] Date of Patent: May 23, 1989

[54] VEHICLE MOUNTED LOAD INDICATOR SYSTEM

[75] Inventors: Richard L. Perini, Creswell, Oreg.; James O. O'Dea, San Clemente, Calif.

[73] Assignee: Accu-Weigh Systems, Inc., Creswell, Oreg.

[21] Appl. No.: 172,324

[22] Filed: Mar. 23, 1988

Related U.S. Application Data

[63] Continuation-in-part of Ser. No. 935,727, Nov. 28, 1986.

[51] Int. Cl.⁴ ............................................. G01G 19/10
[52] U.S. Cl. ..................................... 177/141; 177/146
[58] Field of Search ................................. 177/141, 146

[56] References Cited

U.S. PATENT DOCUMENTS

| | | | |
|---|---|---|---|
| 3,331,458 | 7/1967 | Van Raden et al. | 177/141 |
| 4,456,084 | 6/1984 | Miller | 177/141 |
| 4,588,038 | 5/1986 | Takagi | 177/141 |
| 4,651,838 | 3/1987 | Hamilton et al. | 177/141 X |

OTHER PUBLICATIONS

Four pages of Descriptive Material on a System Termed E-Z Weigh made by Martronic Engineering, Inc.

Primary Examiner—George H. Miller, Jr.
Attorney, Agent, or Firm—James D. Givnan, Jr.

[57] ABSTRACT

A system for use on vehicles having air bag suspension components to provide the operator an accurate reading of the weight of the load carried. Air bag inflation is controlled by a height control valve to maintain a load carrying platform of the vehicle a constant distance from a vehicle axle. Pressure changes in the air bags and a first conduit serving same are communicated to a transducer or the like by a second conduit. A readout device is located in the vehicle operator station. The readout device displays the weight of the load on the platform and is adapted for use with different-sized air bag components.

12 Claims, 2 Drawing Sheets

VEHICLE MOUNTED LOAD INDICATOR SYSTEM

This application is a continuation-in-part of copending U.S. patent application Ser. No. 06/935,727, filed Nov. 28, 1986.

BACKGROUND OF THE INVENTION

The present invention concerns a system providing a load weight readout to a vehicle operator during a loading operation and while underway.

Various systems have been proposed to provide a vehicle operator with the weight of a load using truck and/or trailer mounted sensors coupled with a cab mounted readout device. Generally speaking, the systems proposed have not been widely accepted as they are quite complex and costly to install. Load indicating systems in place on over-the-road trucks and trailers are subjected to severe shock loads as well as other harsh operating conditions. It is noted that proposed load monitoring systems propose the use of costly mechanical and electronic gear susceptible to costly maintenance.

Other load weighing systems for installation on a truck or trailer encounter the drawback of requiring added equipment such as load supporting air bags and bag supported platforms which when installed result in added sprung weight to diminish payload capacity.

U.S. Pat. Nos. 3,854,540; 4,456,084; 3,876,018; and 4,589,507 show systems utilizing pressure sensors responsive to load supporting structures and which are coupled to readout devices.

SUMMARY OF THE PRESENT INVENTION

The present invention is embodied within a load indicating system for use on air bag equipped vehicles of the type having a leveling valve for regulating air bag inflation and load platform height.

Now in use in the trucking industry are air valves, termed by some manufacturers height control valves, which open and close in response to changes in the distance between an axle and the load supporting platform. For example, upon the valve sensing a reduction in this distance it meters additional air into the suspension air bags to restore the predetermined distance. Conversely, an increase in the spacing between axles and load platform, when sensed by the valve, triggers the exhausting of air from the suspension air bags to reduce the distance and restore the preselected spacing.

It has been determined that the sensing of line pressure between a height control valve and the suspension air bags of a vehicle enables a highly accurate signal to a load indicator in the truck cab.

Important objectives include the provision of a vehicle load indicating systeem which may utilize known air valve components already in place on a vehicle for height control, the provision of a load indicating system providing a highly accurate readout of load weight while avoiding the use of sensitive components susceptible to early failure, the provision of a load weight indicator which results in virtually no increase in the sprung weight of the vehicle to preclude payload reductions.

The foregoing and other objects, features, and advantages of the invention will become more apparent from the following detailed description of a preferred embodiment which proceeds with reference to the accompanying drawings.

DETAILED DESCRIPTION OF THE PREFERRED EMBODIMENT

Figure 1:
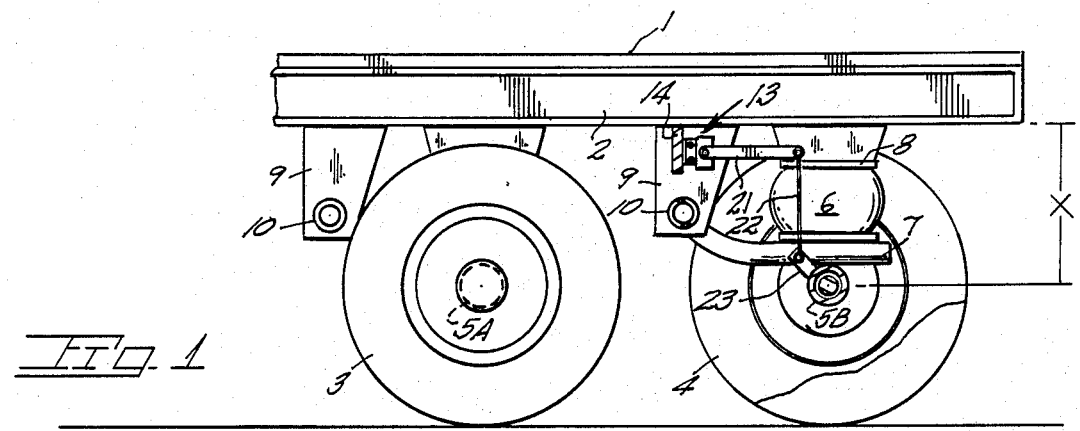
FIG. 1 is a side elevational view of a truck trailer with one set of axle mounted wheels broken away to disclose undercarriage and weighing system components.
Figure 2:
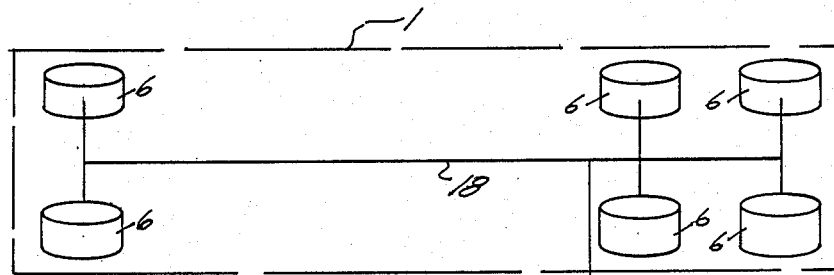
FIG. 2 is a side elevational view of an air control valve used in the present system with related components shown in schematic form.
Figure 2:
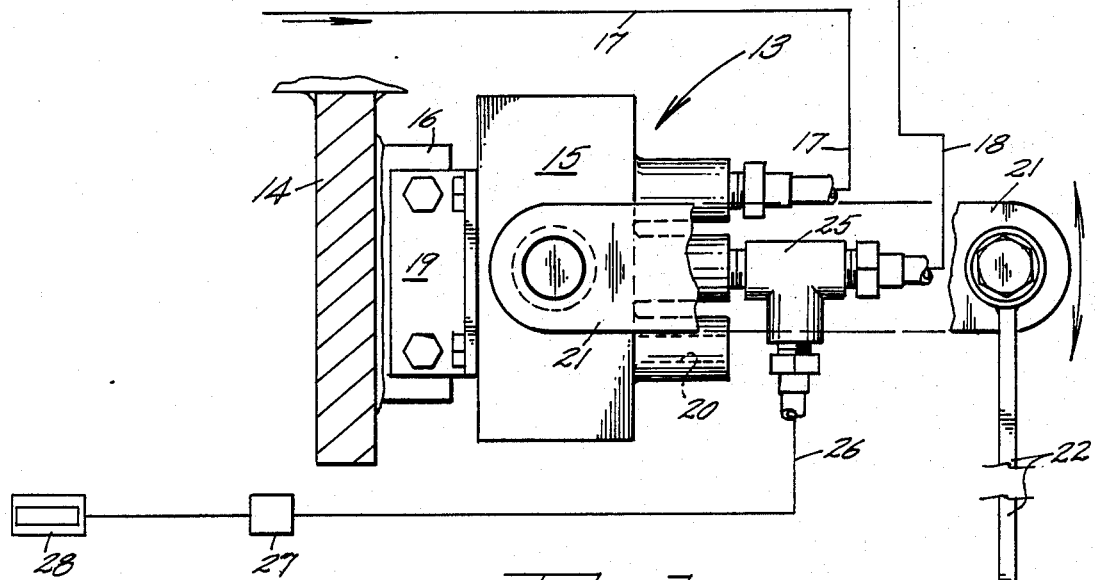
Figure 2:
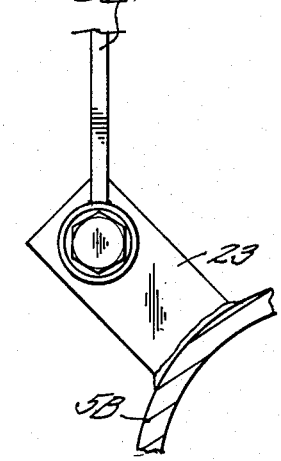

With continuing attention to the drawings wherein reference numerals indicate parts similarly hereinafter identified, the reference numeral 1 indicates a load supporting surface of a vehicle such as a bed of a long haul truck or a trailer having a load carrying frame 2.

A vehicle undercarriage may include wheel assemblies 3 and 4 carried by rear axles at 5A and 5B. The undercarriage includes front and rear pairs of air bags with an air bag typically shown at 6 in FIG. 1. Each air bag is disposed intermediate a swingably mounted axle trailing arm 7 and a frame mounted pad 8. The trailing arm terminates forwardly adjacent a hanger 9 which provides an arm pivot 10. The foregoing is intended to be more or less typical of a heavy duty truck and trailer undercarriage of the air bag type.

Indicated generally at 13 is a height control valve of the three-way type secured in place on a vehicle frame cross member 14. Said height control valve is advantageously disposed at or near the centerline of the vehicle. Said height control valve includes a valve housing 15 affixed by means of a bracket 19 to mounting plate 16 on cross member 14. A valve spool (not shown) in housing 15 serves to communicate air pressure in a line 17 from a source, such as an engine driven compressor, to an air bag supply line 18. Said spool may alternatively serve to communicate line 18 with an exhaust port 20. Spool movement is controlled by a valve actuator arm 21 having its distal end coupled to axle 5B by a tie rod 22 which terminates at an axle mounted bracket 23. Accordingly, (assuming constant air bag inflation) loading of a vehicle load platform will cause arm 21 to be displaced counterclockwise as frame cross member 14 moves downwardly and vice versa. During vehicle loading, the bags 6 are inflated by valve 13 to maintain a predetermined vertical spacing X between axle 5 and the load platform 1. While underway, a time delay feature of such height control valves require that any variation in the spaced relationship occur for a period of seconds before remedial inflation or deflation of the air bags will occur.

A tee at 25 in air line 18 serves an air line 26 which terminates in a pressure responsive device such as a transducer 27 which provides a signal to an indicator 28 which is preferably located in the vehicle cab. The transducer 27 and indicator 28 are adapted to provide the operator with a readout of the load on platform 1.

Figure 3:
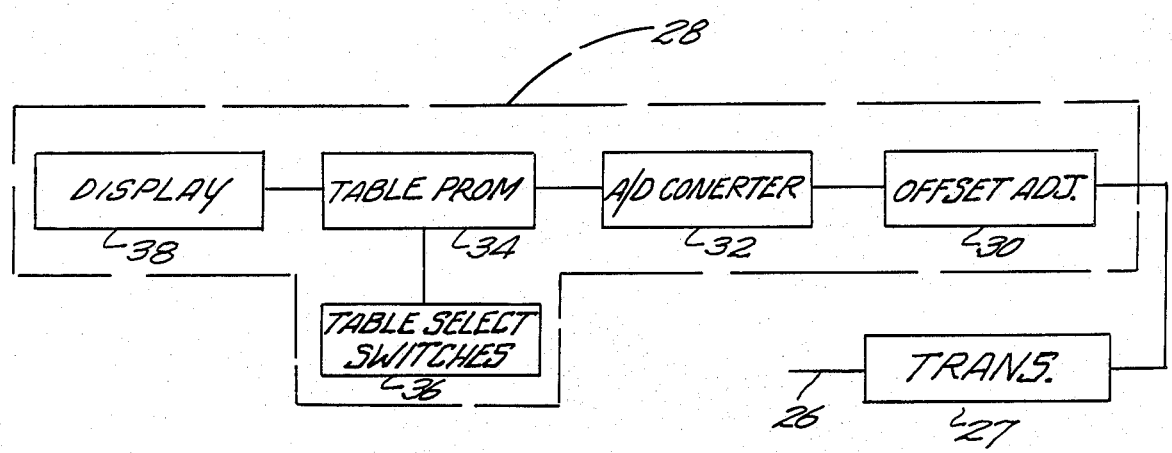
FIG. 3 is a block diagram of a circuit for determining the weight of a load on the trailer platform.

Referring now to FIG. 3, a circuit is shown for determining the weight of a load on platform 1. The transducer 27 comprises a pressure sensor such as sensor No. 242PC100G available from Honeywell which converts air pressure into a DC voltage level signal. The DC signal is routed to a voltage offset circuit 30 that allows the operator to calibrate the voltage signal to the static weight of the vehicle, as will be described. The circuit 30 is the input stage of the indicator 28. The indicator 28 also comprises an analog-to-digital converter (ADC) 32, a programmable read only memory (PROM) 34, table select switches 36, and a readout device 38. ADC 32 converts the DC voltage level signal that is output by the voltage offset circuit 30 into a corresponding digital signal. The digital signal in turn forms part of the address to PROM 34, which includes a number of look-up tables. As will be described, one of the look-up tables is adapted to convert the value of the address to pressure data that indicates the air pressure. The other look-up tables are adapted to convert the value of the address to weight data that cover the range of possible weights to be carried by the platform 1. These weight tables differ in the conversion factor applied to the address, which factor depends on the size of the air bag suspension system. The look-up table that is selected is determined by operator input via his setting of table select switches 36. The output of switches 36 forms another part of the address to PROM 34. The weight data in the selected table is read from PROM 34 by a readout device 38 comprising a conventional digital display driver and seven segment displays. The device 38 displays the data for the operator as the load weight on platform 1.

The conversion factor applied between the air pressure and load weight depends on the area of the air bags supporting the load. This area can differ from vehicle to vehicle because of different-sized trailers, tractors, etc. For example, a change in air pressure of 10 pounds psi over 500 square inches of air bag area indicates an additional load of 5000 pounds. Because different-sized air bags are used for different-sized vehicles, PROM 34 has stored within it the plurality of weight tables referred to above, each relating to a different-sized surface area. PROM 34 also includes the additional table of air pressures. To determine the surface area of the bags, the air pressure table is first selected, preferably by default setting of the switches 36, and is read by the operator to find an initial air pressure. A load of a known weight is then placed on platform 1 and the resultant pressure change is found from reading the device 38. By then dividing the known weight (e.g., pounds) by the change in air pressure (e.g., pounds per square inch), the surface area of the bags can be found. From a list provided the operator, the appropriate look-up table associated with this surface area is then selected within the PROM 34 by setting the switches 36 as directed. The selected table is calibrated by comparing the displayed weight against the known weight. If a discrepancy between the two weights exists, the selected table is calibrated by adjusting the DC voltage level offset of circuit 30. This adjustment changes the voltage signal routed to the ADC 32 which in turn changes the value of the address routed to the PROM 34 until the displayed weight matches the known weight.

One suitable height control valve is that valve manufactured by Suspension Systems Incorporated. Other height control valves are usable with the present system. A typical tractor and trailer combination would utilize two separate indicator systems. The increase in air pressure in line 18 and air bags 6 to maintain distance X when platform 1 is loaded is directly proportional to the air pressure valve required to maintain distance X when the platform is unloaded.

While we have shown but one embodiment of the invention, it will be apparent to those skilled in the art that the invention may be embodied still otherwise without departing from the spirit and scope of the invention.

Having thus described the invention, what is desired to be secured in a Letters Patent is:

We claim:

1. A load indicator system for a wheel supported vehicle having an air bag suspension component between the vehicle undercarriage and a load carrying frame of the vehicle, said system comprising:

a valve for mounting on a vehicle frame member and in communication with a source of air pressure of a value for air bag inflation, said valve having an exhaust port;

first conduit means in communication with said valve and the air bag suspension component;

second conduit means in communication with said first conduit means;

said valve having a control arm having a distal end for attachment to an undercarriage component of the vehicle;

said valve operable upon control arm displacement from a preset position to increase air pressure in said air bag component or decrease in pressure in said component to raise or lower the vehicle frame relative said undercarriage component to maintain a predetermined vertical distance between the vehicle frame and the undercarriage component;

pressure responsive means in communication with said second conduit means and producing a signal;

a readout display responsive to said signal to provide a numerical display of the load carried;

memory means in communication with said pressure responsive means for storing a plurality of selectable tables for converting the signal produced by said pressure responsive means into weight data within a table, each table associated with the surface area of a different-sized air bag suspension component; and means in communication with said memory means for selecting from the plurality of tables the table associated with the surface area of the air bag suspension component for the vehicle, the weight data from the selected table provided to the readout display.

2. The load indicator system claimed in claim 1 wherein said first and second conduit means are in open communication by means of a tee fitting.

3. The load indicator system claimed in claim 1 wherein said valve control arm is responsive to changes in the vertical distance between the load carrying frame and the center of a vehicle axle.

4. The load indicator system claimed in claim 2 wherein said first conduit means serves air bags supporting opposite ends of the vehicle frame.

5. A load indicator system for a wheel supporting vehicle having an air bag suspension component between the vehicle undercarriage and a load carrying frame of the vehicle, said system comprising:

pressure responsive means for converting the air pressure sensed within the air bag suspension component into a signal;

a plurality of selectable tables in communication with the pressure responsive means for converting the pressure signal to weight data within a table, each table associated with the surface area of a different-sized air bag suspension component;

means in communication with said plurality of selectable tables for selecting the table associated with the surface area of the air bag suspension component for the vehicle; and means in communication with said plurality of selectable tables for displaying the weight data from the selected table to indicate the load.

6. The load indicator system claimed in claim 5 including means in communication with the pressure responsive means for determining the surface area of the air bag suspension component.

7. The load indicator system claimed in claim 5 including means in communication with the pressure responsive means for calibrating the selected table.

8. The load indicator system claimed in claim 5 wherein the air pressure converting means comprises a transducer for converting the sensed pressure to a DC voltage level and an analog-to-digital converter for converting the DC voltage level to a digital signal.

9. The load indicator system claimed in claim 5 wherein the plurality of tables are stored with a memory that is addressed by the pressure signal.

10. The load indicator system claimed in claim 5 wherein the selecting means comprises switches for selecting a table.

11. A load indicator system for a wheel supported vehicle having an air bag suspension component between the vehicle undercarriage and a load carrying frame of thee vehicle, said system comprising:

a pressure sensor for converting the air pressure sensed within the air bag suspension component into a DC voltage level;

an analog-to-digital converer in communication with the pressure sensor for converting the DC voltage level to a corresponding digital signal;

memory means in communication with the analog-to-digital converter for storing a plurality of tables for converting the digital signal to weight data within a table, each table associated with the surface area of a different-sized air bag suspension component;

switch means in communication with the memory means for selecting the table associated with the surface area of the air bag suspension component from the plurality of tables for the vehicle; and means in communication with the memory means for displaying the weight data from the selected table.

12. The load indicator system claimed in claim 11 including a table within the memory means for converting the digital signal to air pressure, the table provided for determining the surface area of the air bag suspension component from a change in air pressure caused by the loading of a known weight onto the load carrying frame.

* * * * *